United States Patent
Simington

[11] 3,890,857
[45] June 24, 1975

[54] AUTOMATIC CHAIN SHARPENER

[76] Inventor: Jack F. Simington, Star Rt. Box 141, Chiloquin, Oreg. 97624

[22] Filed: June 20, 1974

[21] Appl. No.: 481,447

Related U.S. Application Data

[63] Continuation-in-part of Ser. No. 392,889, Aug. 30, 1973.

[52] U.S. Cl............................ 76/25 A; 76/37; 76/43
[51] Int. Cl............................................. B23d 63/16
[58] Field of Search.......... 76/37, 38, 39, 43, 25 A, 76/40

[56] References Cited
UNITED STATES PATENTS

| | | | |
|---|---|---|---|
| 1,748,686 | 2/1930 | Strehle | 76/43 |
| 2,353,956 | 6/1944 | Enholm | 76/43 |
| 2,824,468 | 2/1958 | Nielsen | 76/40 |
| 3,695,123 | 10/1972 | Silvey | 76/25 A |

*Primary Examiner*—Leonidas Vlachos
*Attorney, Agent, or Firm*—Clarence A. O'Brien; Harvey B. Jacobson

[57] ABSTRACT

An upstanding support is provided and a rotary grinding head is journaled from the upper end of the support for rotation about an inclined axis. A pair of chain support mounts are mounted on the upright support on opposite sides of an upstanding plane in which the axis of rotation of the rotary grinding head is disposed and the chain support mounts are mounted for rectilinear horizontal shifting along a path normal to the aforementioned plane and disposed in a second plane normal to the first-mentioned plane, paralleling the axis of rotation of the rotary head and extending along a chord of the rotary grinding head. Each of the chain support mounts includes structure for supporting a continuous saw chain therefrom and a motor is drivingly connected to the chain support mounts for oscillating the latter along their path of movement. Also, each of the chain support mounts comprises a peripherally grooved disc supported for rotation about an axis extending along the aforementioned path and a second motor is drivingly coupled to the endless saw chain for lengthwise advancing the latter and thus imparting rotary movement to the grooved disc over which the endless chain saw is trained. The second motor is drivingly connected to the endless saw chain by means of a slip type drive connection and the support includes adjustable abutment structure with which successive saw chain teeth passing about the peripherally grooved disc and disposed on one side of the saw chain are engageable to limit lengthwise advancement of the chain. The abutment is engageable by successive saw chain teeth upon movement of the corresponding chain support mount away from a vertical plane containing the axis of rotation of the rotary grinding head and each chain support mount is movable out of registry with the corresponding abutment upon movement of that chain support mount toward the lastmentioned plane. Further, actuating structure is provided to intermittently actuate the second-mentioned motor in timed sequence with oscillation of the chain support mounts along their path of rectilinear horizontal shifting.

4 Claims, 8 Drawing Figures

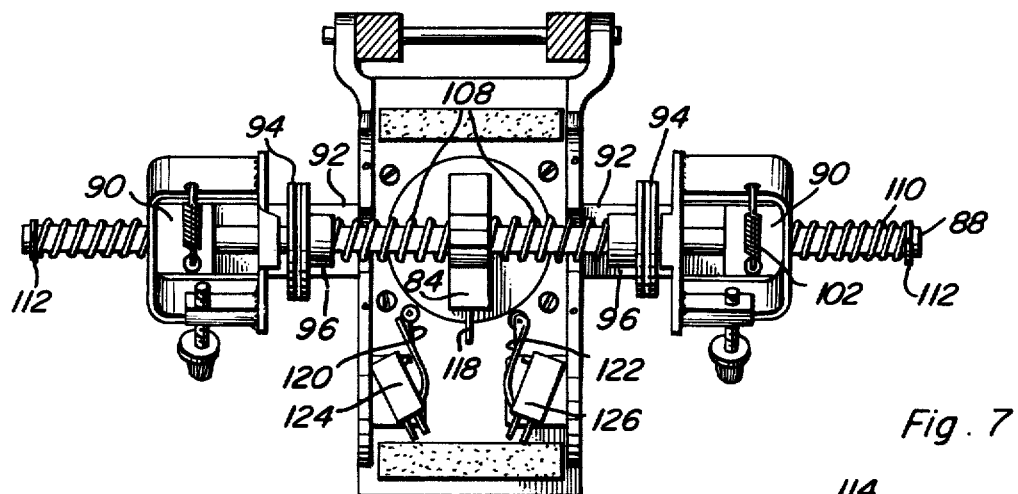
Fig. 3
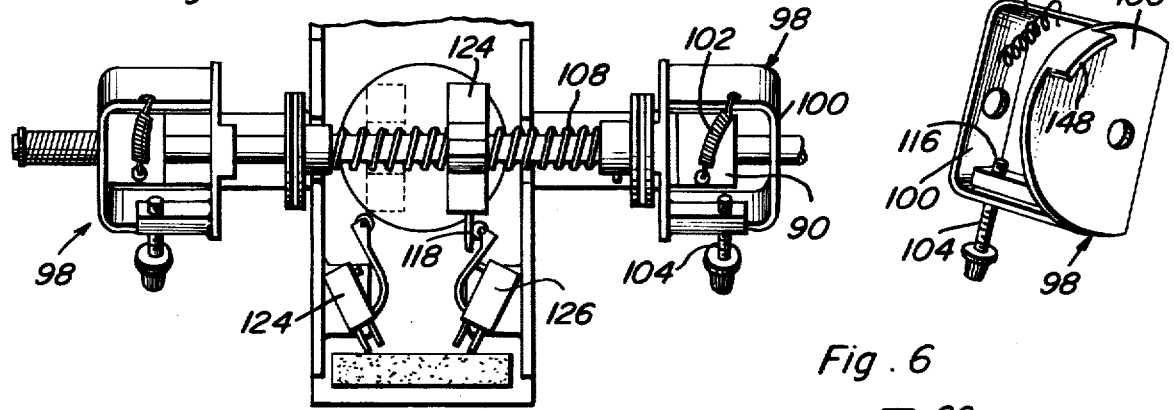
Fig. 4
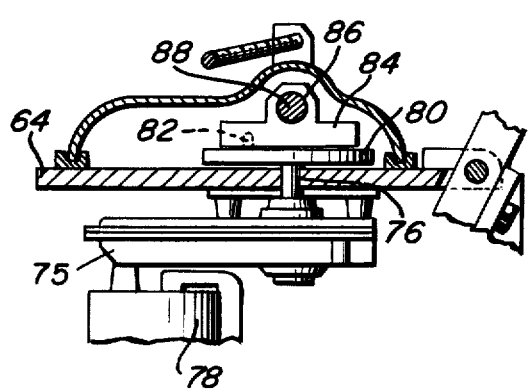
Fig. 7
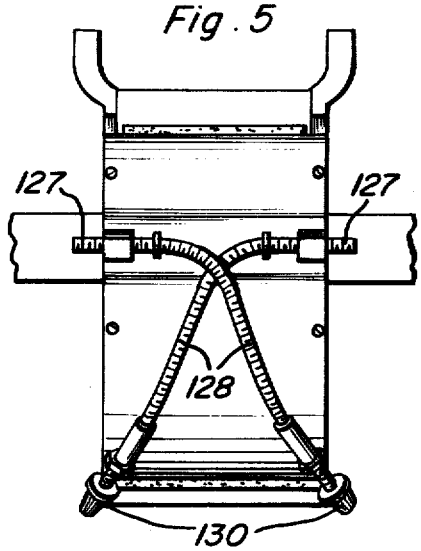
Fig. 5
Fig. 6

AUTOMATIC CHAIN SHARPENER

This application comprises a continuation-in-part of my copending U.S. application Ser. No. 392,889 for Chain Saw Sharpener, filed Aug. 30, 1973.

BACKGROUND OF THE INVENTION

Heretofore chain saw sharpening devices have been provided whereby both the right and left hand teeth of a saw chain may be sharpened. However, in order to sharpen a chain in a manner such that it may cut in a perfectly even manner precisely the same bevel and depth of bevel must be formed not only on each cutting tooth on one side of the chain but the same bevel and depth of bevel must be formed on the cutting teeth on the other side of the chain. While there are most certainly means by which such precise sharpening of a saw chain may be carried out, these methods include extremely complex structure and considerable time must be spent in sharpening the saw chain. Of course, there becomes a point at which the expense of machinery and the time spent in sharpening a saw chain to substantially perfect precision becomes uneconomical and the cost of precisely sharpening a saw chain approaches the cost of a new chain. Accordingly, less expensive and complex structure and less time is most often used in sharpening a saw chain with the result that the saw chain is sharpened to a usable, but less than perfect, condition. Further, most saw chain sharpening machinery which is not extremely complex and expensive requires an operator to the extent that each tooth to be sharpened is individually placed in sharpening position by the operator of the machine or apparatus. Therefore, the cost incident to sharpening a saw chain is not only determined in part by the cost of the machinery used to sharpen the saw chain but to a greater extent by the time spent by the operator of a saw chain sharpening machine during the process of sharpening a chain saw.

Examples of related chain sharpeners may be found in U.S. Pat. Nos. 1,748,686; 2,353,956; 2,410,828; 2,318,456; 2,217,145 and 3,611,839.

BRIEF DESCRIPTION OF THE INVENTION

The chain sharpener of the instant invention is constructed in a manner whereby once a saw chain to be sharpened has been properly positioned on the machine and the machine has been actuated all of the teeth on one side of the chain will be precisely sharpened to the same extent automatically and without the need of an operator of the machine during the sharpening process. After all of the teeth on one side of the chain have been sharpened, the machine is temporarily halted until the chain can be removed from the machine and repositioned thereon in a position to have the teeth on the other side of the chain sharpened. After re-positioning of the saw chain is accomplished, it is merely necessary for the operator to again start the machine and thereafter return to the machine only after all of the teeth on the second side of the chain have been sharpened.

The main object of this invention is to provide a simple apparatus through the utilization of which a saw chain may have each of the cutting teeth thereof, on both the right hand and the left hand sides, sharpened in exactly the same manner with a minimum of labor.

Another object of this invention, in accordance with the immediately preceding object, is to provide a saw chain sharpening device which may be readily adjusted for use in conjunction with various types of saw chains.

A still further object of this invention is to provide a saw chain sharpening device of the type including a rotary grinding head and provided with means for trueing the rotary grinding wheel of the grinding head and making the necessary adjustments to compensate for material removed from the grinding wheel preparatory to again resuming saw chain sharpening operations.

Another important object of this invention is to provide a saw chain sharpening device which may be utilized by persons possessing less than the usual amount of skill required to properly sharpen a saw chain.

Another very important object of this invention is to provide a saw chain sharpening device which may be actuated to automatically sharpen all of the saw chain teeth on one side of the chain without the need for an operator of the machine during the sharpening process and which will then require only a short and simple task by the operator of the machine to re-position the chain thereon after which all of the teeth on the other side of the chain will be automatically sharpened without the need for attention by the operator of the machine.

A final object of this invention to be specifically enumerated herein is to provide a saw chain sharpening device in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings, forming a part hereof, wherein like numerals refer to like parts throughout.

BRIEF DESCRIPTION OF THE DRAWINGS

FIG. 3 is a fragmentary horizontal sectional view illustrating a portion of the drive assembly by which the saw chain supporting structure of the invention is reciprocably driven along a horizontal path extending transversely of the axis of rotation of the rotary grinding head of the machine;

FIG. 4 is a fragmentary horizontal plan view similar to FIG. 3 but illustrating the saw chain supporting structures in a position displaced to one limit position thereof from the center position thereof illustrated in FIG. 3;

FIG. 5 is a fragmentary plan view illustrating the manner in which inward movement of each of the chain saw supporting discs may be adjustably limited;

FIG. 6 is a fragmentary vertical sectional view taken substantially upon a plane passing through the center of FIG. 3 and illustrating an upper cover portion which is removed from the structure illustrated in FIG. 3;

FIG. 7 is a perspective view of one of the chain advancement limiting structures.

DETAILED DESCRIPTION OF THE INVENTION

Figure 1:
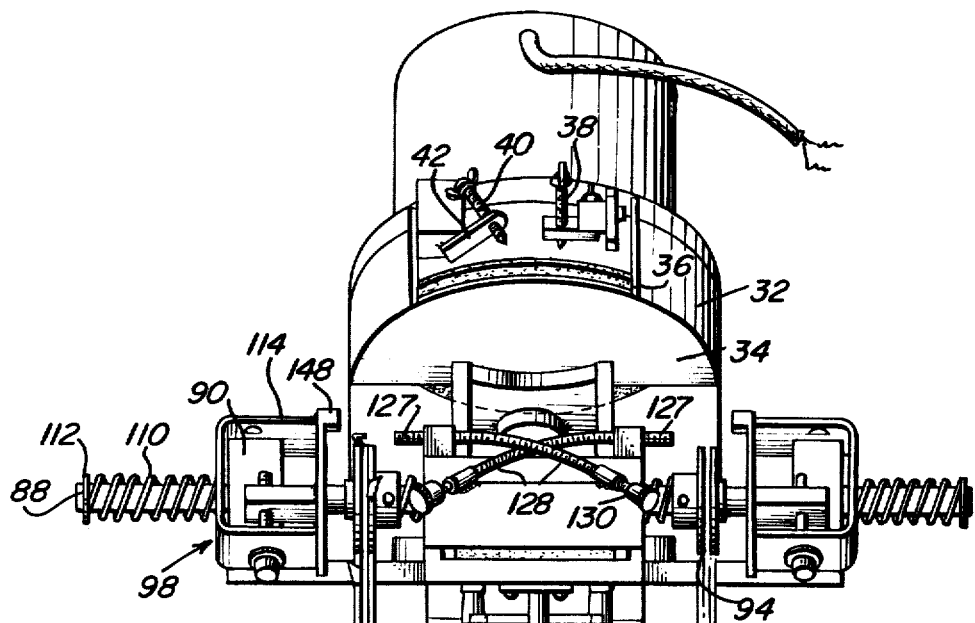
FIG. 1 is a fragmentary elevational view of the upper portion of the chain saw sharpening device of the instant invention illustrating the chain saw chain supporting structure and grinding head.

Referring now more specifically to the drawings, the numeral 10 generally designates the automatic saw chain sharpener of the instant invention. The sharpener 10 includes an upstanding support 12 including lower end support legs 14 and a performed support head 16 removably supported from the upper end of the standard 12 by means of suitable fasteners 18. The support head 16 includes a mounting flange portion 20 to which a mounting plate 22 is secured. The mounting plate 22 is slotted and a threaded fastener 24 is secured through the slot in the mounting plate 22 and in the mounting flange portion 20 whereby the mounting plate portion 22 may be supported in adjusted shifted position along the inclined mounting flange portion 20.

An electric motor 26 is supported from the mounting plate 22 in any convenient manner and includes a rotatable output shaft 28 upon which a beveled grinding wheel 30 is mounted. A partial cylindrical shield 32 is supported from the mounting plate 22 and includes a partial bottom wall 34 having a front window 36 formed therein and the shield 32 surrounds the forward half of the grinding wheel 30. Further, a first grinding wheel trueing member or dresser 38 is threadedly supported from the mounting plate 22 and a second similar dresser 40 is threadedly supported from a mount 42 supported from the mounting plate 22. Further detailed description of the mounting of the dressers 38 and 40 will not be set forth hereinafter, but will be apparent from the description of the identical components described in my above-mentioned copending U.S. application Ser. No. 392,889.

The standard or support 12 has a mounting clamp sleeve 44 disposed thereon and the sleeve 44 is provided with an operating screw 46 whereby the mounting clamp sleeve 44 may be loosened, shifted along the standard 12 and thereafter tightened for semi-permanent positioning on the standard 12. The side of the mounting clamp sleeve 44 remote from the screw 46 has one end 48 of a lever arm 50 pivotally secured thereto by means of a pivot fastener 52. An intermediate portion of the lever arm 50 has a gear motor 54 supported therefrom including rotatable output shaft end portions 56 projecting outwardly from opposite sides thereof and having grooved support discs 58 mounted thereon. Also, the mounting clamp sleeve 44 includes a depending arm portion 60 and an expansion spring 62 is connected between the lower end of the arm portion 62 and the gear head motor 54 whereby the free end of the lever 50 is yieldingly biased downwardly.

A support arm structure 64 has one bifurcated end 66 thereof pivotally supported from the support head 16 by means of a pivot pin 68. In addition, the standard 12 includes a horizontal forwardly projecting arm 70 spaced below the support arm structure 64 and the lower end portion of a threaded upstanding adjustment screw 72 is threaded through the forward end of the arm 70 and has its upper end rotatably seated in a bracket 74 secured to the underside of the free end of the support arm structure 64. Accordingly, rotation of the adjusting screw 72 will cause the angular position of the support arm structure 64 to be varied.

The underside of the support arm structure 64 supports a reduction gear assembly 75 including an output shaft portion 76 rotatably received upwardly through the support arm structure 64. An electric motor 78 is supported from the reduction gear assembly 75 and includes a rotatable output shaft drivingly coupled to the input shaft (not shown) of the reduction gear assembly 75. The upper end of the output shaft 76 has a disc 80 mounted thereon and the disc 80 includes an upstanding pin 82 eccentrically disposed thereon and slidably engaged in a downwardly opening longitudinal slot (not shown) formed in an elongated follower 84 having a bore 86 formed therethrough in which a shaft 88 is slidably received. The opposite ends of the shaft 88 are slidable through bored support blocks 90 carried by the outer ends of oppositely outwardly projecting support arms 92 projecting outwardly from opposite sides of the mounting plate 64 and a pair of circumferentially grooved saw chain support discs 94 are fixed in adjusted position along the shaft 88 by means of setscrews 96. Also, a chain index frame referred to in general by the reference numeral 98 is slidably and rotatably mounted on each end portion of the shaft 88 immediately outwardly of the corresponding saw chain support disc 94. Each index or indexing frame 98 includes a portion 100 thereof which also rotatably and slidably receives the corresponding end portion of a shaft 88 therethrough and which is disposed immediately outwardly of the corresponding support block. An expansion spring 102 is operatively connected between each support block 90 and the corresponding indexing frame 98 and each frame 98 includes an adjustable abutment screw 104 abuttingly engageable with the corresponding support block 90. The portion 100 of each indexing frame 98 is disposed immediately outward of and engageable by the corresponding saw chain support disc 94 and the opposing portion 106 of each indexing frame 98 is disposed immediately outwardly of the corresponding support block 90 and abuttingly engageable thereby.

A pair of compression springs 108 are disposed about the shaft 88 between the follower 84 and the opposing ends of the support discs 94 and a second pair of slightly lesser strength compression springs 110 are disposed on the outer ends of the shaft 88 between the portions 106 of the indexing frames 98 and removable abutments 112 carried by the terminals ends of the shafts 88.

The springs 102 yieldingly bias the indexing frames 98 toward positions thereof with the connecting portions 114 of the frames 98 extending between the portions 100 and 106 abutted against the corresponding support arms 92 and the inner ends 116 of the adjustable abutment screws 104 are engageable with the support blocks 90 to limit angular displacement of the indexing frames away from the limit positions thereof to which the frames 98 are biased by the springs 102.

The follower 84 includes a switch actuator arm 118 which is engageable with the spring-biased actuators 120 and 122 of a pair of normally open switches 124 and 126 carried by the mounting plate 64. Also, a pair of threaded abutment screws 127 are threadedly supported from the mounting plate 64 and include flexible operating shafts 128 provided with knobs 130 on their ends remote from the abutment screws 127. The knobs 130 are disposed slightly above the forward end of the mounting plate 64 for ease in operation and the adjusting screws 127 are engageable by the opposing sides of the saw chain support discs 94 to limit their inward movement toward the center of the plate 64.

In operation, after the grinding wheel 30 has been properly dressed and the mounting plate 22 has been adjustably positioned as desired, the elevation of the forward end of the support arm structure or mounting plate 64 is adjusted and the free end of the lever 50 is raised and an endless saw chain 140 is trained over one of the discs 94 and the corresponding disc 58 after which the forward end of the lever 50 may be lowered under the biasing action of the spring 62. When the chain 140 is thus mounted the guide lugs 142 thereof are received within the peripheral groove formed in the disc 94. Suitable switch means 144 may be then actuated to actuate the motor 78 in order to cause the shaft 88 to be reciprocated. During reciprocation of the shaft 88 the supported chain 142 will move toward and away from the adjacent peripheral portion of the grinding wheel 30 and any necessary adjustment of the adjusting screws 127 may be made. In addition, when properly setting the grinder 10 the supported chain 142 is advanced in a clockwise direction as viewed in FIG. 2 of the drawings until a tooth of the chain 142 engages the abutment flange 148 carried by the portion 106 of the corresponding indexing frame. After engagement of the tooth with the abutment flange 148 the chain 142 is further advanced in a clockwise direction until the corresponding abutment screw 104 engages the corresponding support block 90. If the tooth of the chain 140 on the side of the chain remote from the abutment flange 148 is not properly advanced about the axis of rotation of the shaft 88 for proper grinding of that tooth by the grinding wheel 30, then an adjustment of the adjustment screw 104 is made until the correct positioning of the tooth to be sharpened is ground. The surface of the support block 90 engaged by the abutment screw 104 parallels the longitudinal center axis of the shaft 88.

After the abutment screws 104 and 127 have been properly adjusted, it is merely necessary to actuate the motor 26 by means of the switch means 150 provided therefor.

Then, as the shaft 88 is shifted to the right as viewed in FIG. 3 of the drawings the switch actuator abutment 118 contacts the actuator 122 for the switch 126 and causes the gear motor 54 under the control of the switch 126 to be actuated. Thus, the chain 140 is slowly advanced in a clockwise direction as viewed in FIG. 2 of the drawings in order to advance the next tooth thereof on the outside of the chain 140 into engagement with the corresponding abutment flange 148. Continued operation of the gear motor 54 then causes the corresponding index frame to rotate to the limit position thereof as defined by the abutment screw 104 and if any further operation of the gear motor 54 occurs the corresponding disc 58 merely slips relative to the chain 140. Then, as the shaft 88 reaches its limit position of movement to the right and begins its return movement to the left the switch 126 is deactivated to terminate operation of the gear motor 54 and the tooth on the chain 142 adjacent the grinding wheel 30 is moved toward engagement with the latter until such time as the right hand support disc 94 in FIG. 3 engages the corresponding abutment screw 127 just prior to which time the tooth to be sharpened will contact the periphery of the grinding wheel. Then, the necessary material of the tooth to be sharpened will be removed by the grinding wheel 30 as final movement of the right hand support disc 94 toward engagement of the abutment screw 127 is accomplished, the shaft 88 being slidable through the follower bore 86, but under the influence of the compression springs 108. Further, inasmuch as the indexing frames 98 are under the biasing action of the springs 110, the indexing frames 98 have their portions 106 engaged with the outer sides of the corresponding support discs 94 until such time as inward movement of the support discs 94 toward the grinding wheel is sufficient to cause the portions 100 of the indexing frames 98 to engage the outer sides of the support blocks 90.

After each tooth is ground, the return movement of the shaft 88 to the right moves the sharpened tooth away from contact with the grinding wheel 30 and thus enables subsequent clockwise advancement of the chain 140 under the influence of the gear motor 54 after the chain 140 has been moved out of the area of contact with the grinding wheel 30. Still further, after a chain tooth on the outer side of the chain 140 has engaged the abutment flange 148 and the corresponding indexing frame 98 has been angularly displaced to move the corresponding abutment screw 104 into contact with the associated support block 90 subsequent inward movement of the shaft 88 is initially accompanied by inward movement of the corresponding indexing frame. However, before inward movement of the associated support disc 94 is completed the portion 100 of the indexing frame will engage the outer side of the corresponding support block 90 to terminate inward movement of the indexing frame 88 and the tooth of the chain engaged with the abutment flange 48 will slide laterally off one end of the flange 48 so as to be free of the corresponding indexing frame 98 during the tooth grinding operation.

Inasmuch as the tension spring 62 tensions the chain 140 and the discs 58 are driven at slow rpm through a gear reduction assembly, the frictional engagement of the chain 140 with the stationary disc 58, after termination of operation of the gear motor 54, maintains the chain 140 in adjusted position against the biasing action of the spring 102 of the corresponding indexing frame 98 during movement of the tooth to be sharpened into contact with the grinding wheel 30.

After each tooth on one side of the chain 140 has been sharpened, the chain is removed from one side of the sharpener 10 and re-installed on the other pair of discs 58 and 94 in order to sharpen the teeth on the other side of the chain. Thus, after the sharpener 10 has been properly adjusted each tooth on each side of the chain will be sharpened to substantially the same configuration and the teeth on opposite sides of the chain will be sharpened in a manner so as to have substantially the same configuration.

In the circuitry connecting the switches 124 and 126 to the gear motor 54 on-off switches (not shown) are provided whereby one of the switches 124 and 126 may be rendered inoperative. Thus, the gear motor 54 is electrically actuated only upon movement of the shaft 88 to a position adjacent one of its limit positions of movement. After the teeth on one side of the chain have been sharpened and the chain has been removed from the grinder and replaced on the other side thereof the first actuated operating switch for the gear motor 54 is deactivated and the previously inoperative switch for the motor 54 is activated whereby the gear motor will then be actuated upon movement of the shaft 88 to a position adjacent its other limit position of movement.

Of course, after the grinder or machine 10 has initially been adjusted, it is merely necessary to place the chain to be sharpened first on one side of the machine and then on the other side of the machine. After positioning the chain 140 on each side of the machine further operation of the machine is completely automatic until such time as all of the teeth on that side of the chain have been sharpened and it is necessary to shift the chain 140 to the other side of the machine.

Figure 8:
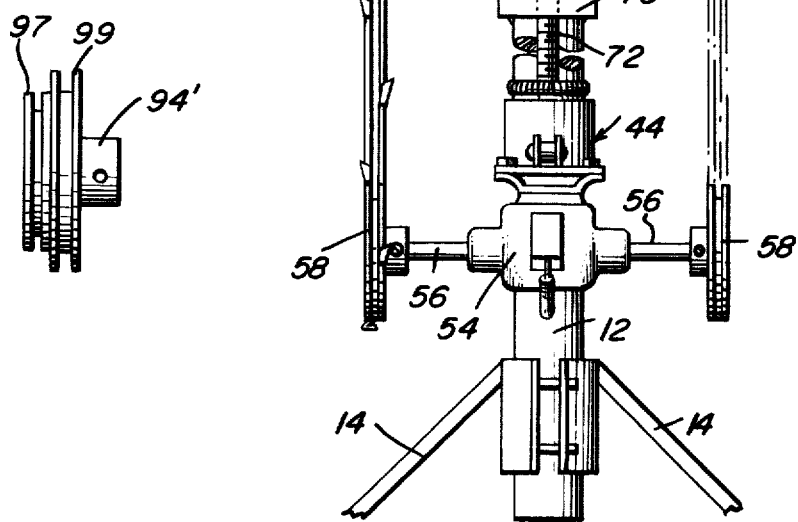
FIG. 8 is an elevational view of a modified form of chain support disc.

In FIG. 8 there is illustrated a modified form of chain support disc 94'. The disc 94' may be substituted for each of the discs 94 and differs from the latter in that it includes a pair of axially spaced peripherally grooved cylindrical portions 97 and 99 of different diameters for accomodating chain saw chains of different sizes.

Figure 2:
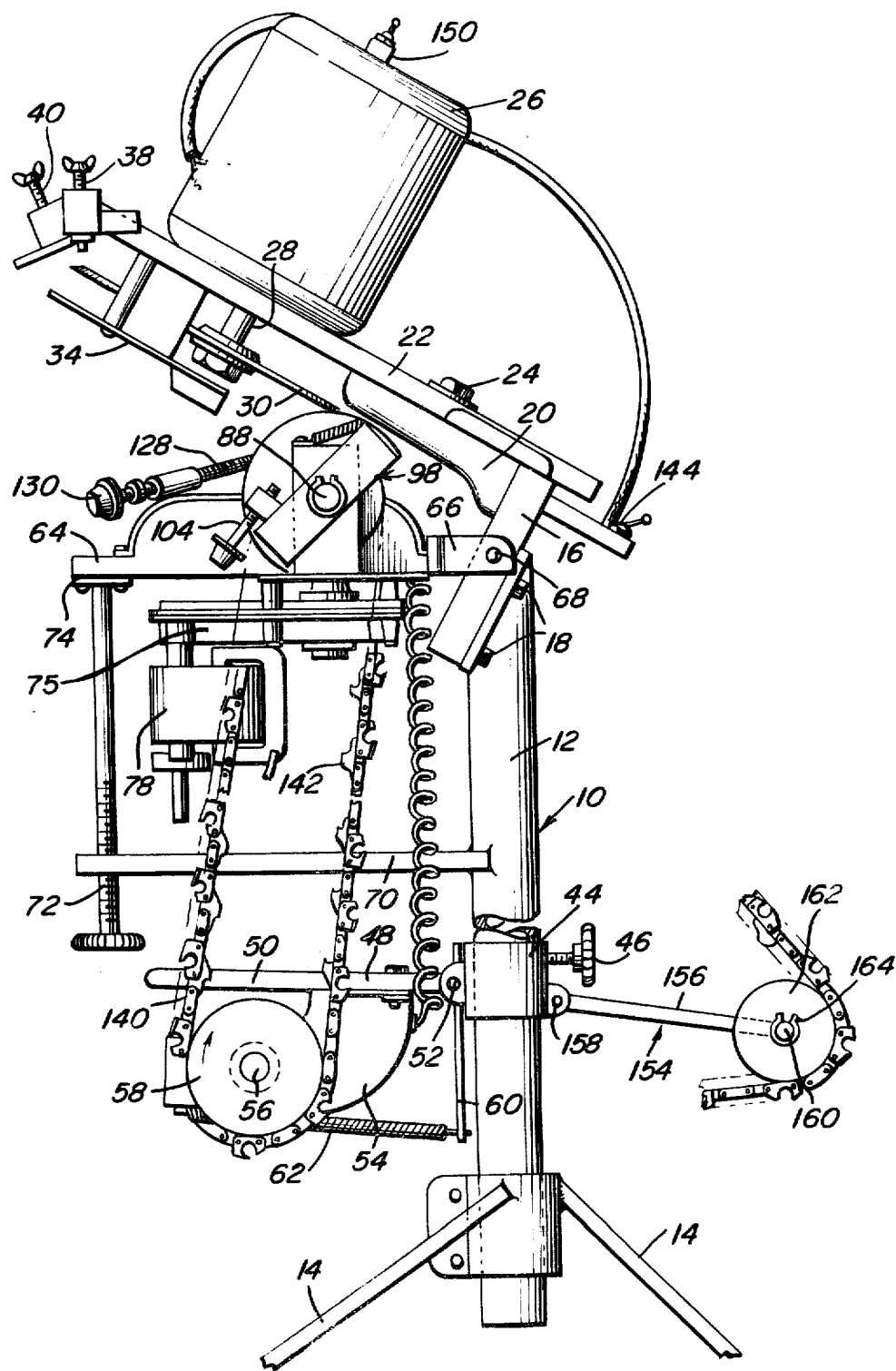
FIG. 2 is a fragmentary side elevational view of the assemblage illustrated in FIG. 1 as seen from the right side thereof and with a supplemental saw chain support structure mounted thereon whereby a chain of longer length may be supported from the device for sharpening thereon.

Further, in FIG. 2 a supplemental saw chain support structure generally referred to by the reference numeral 154 as illustrated and includes a support arm 156 pivotally supported at one end between a pair of spaced mounting ears 158 carried by the clamp sleeve 44. The free end of arm 156 includes a horizontal crosshead shaft 160 rigidly supported therefrom and a pair of grooved support discs 162 are rotatably and slidably mounted on the opposite ends of the shaft 160 between pairs of spaced snap rings 164 removably supported on the opposite ends of the shaft 160. When a saw chain appreciably longer than chain 140 is to be sharpened such longer chain is trained about the discs 58 and 94 as well as the corresponding disc 162.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A chain saw chain sharpening device comprising a support, a rotary grinding head journaled from said support, a pair of chain support mounts mounted on said support and including portions thereof on opposite sides of said head supported for shifting along a first path extending transversely of the axis of rotation of said head, said support mounts including means for supporting a saw chain for guided lengthwise adjustment of said chain along a second path transverse to said axis and said first path, first driven means drivingly connected to said support mount portions for reciprocating the latter along said first path and second drive means for intermittently advancing said chain in timed relation to reciprocation of said support mount portions, an elongated support member rotatably supported from said support and extending and lengthwise reciprocal along said first path, said support mount portions including support discs mounted on said support member for rotation and reciprocation with said support member and about each of which a saw chain may be trained, said first drive means including a follower and being drivingly connected to said support member for reciprocation of the latter, said first drive means including a lost motion connection with said support member, and adjustable limit means carried by said support and engageable by said support discs to limit movement of the latter away from the axis of rotation of said grinding head, said lost motion connection including a pair of opposing springs connected between said follower and said support discs.

2. In combination, a support, a elongated support member rotatably and slidably mounted from said support for rotation about and reciprocation along its center axis relative to said support, a pair of saw chain support discs mounted on said support member in stationary position thereon at points spaced along said support member intermediate its opposite ends, a motor driven follower mounted on said support for reciprocation along the path of reciprocation of said support member and disposed between said discs, opposing spring means connected between said follower and discs yieldingly biasing said discs, and thus said support member, toward their limits of oscillation, adjustable abutment means carried by said support and engageable by said discs to limit their movement toward a center transverse plane stationary relative to said support, disposed generally normal to the path of oscillation of said support member and disposed between said discs, a pair of abutment members mounted on the end portions of said support member outwardly of said discs for shifting with said end portions and shifting of said end portions relative to said abutment members, said abutment members each including inner and outer portions spaced along said support member on opposite sides of abutment portions of said support engageable by said abutment member portions, second spring means connected between the end portions of said support member and said abutment members yieldingly biasing the latter toward inner positions with said outer portions thereof abutted against the corresponding abutment portions of said supports, said discs being engageable with the corresponding inner portions of said abutment members movement of said discs away from said plane.

3. In combination a support, an elongated support member rotatably and slidably mounted from said support for rotation about and reciprocation along its center axis relative to said support, a pair of saw chain support discs mounted on said support member in stationary position thereon at points spaced along said support member intermediate its opposite ends, a motor driven follower mounted on said support for reciprocation along the path of reciprocation of said support member and disposed between said discs, opposing spring means connected between said follower and discs yieldingly biasing said discs, and thus said support member, toward their limits of oscillation, adjustable abutment means carried by said support and engageable by said discs to limit their movement toward a center transverse plane stationary relative to said support, disposed generally normal to the path of oscillation of said support member and disposed between said discs, a pair of abutment members mounted on the end portions of said support member outwardly of said discs for shifting with said end portions and shifting of said end portions relative to said abutment members, said abutment members each including inner and outer portions spaced along said support member on opposite sides of abutment portions of said support engageable by said abutment member portions, second spring means connected between the end portions of said support member and said abutment members yieldingly biasing the latter toward inner positions with said outer portions thereof abutted against the corresponding abutment portions of said supports, said discs being engageable with the corresponding inner portions of said abutment members upon movement of said discs away from said plane, said abutment members being also mounted on said support member end portions for relative rotation therebetween, said abutment members including abutment sections abuttingly engageable with the corresponding abutment portions of said support to limit oscillation of said abutment members relative to said support member, one of said abutment sections being adjustably supported from each abutment member, and each inner abutment member portion including an abutment element carried thereby engageable with a chain tooth supported from the adjacent disc.

4. A chain saw sharpening device comprising a rotary grinding head, saw chain support member shiftable back and forth along a first path transverse to the axis of rotation of said head and including means for intermittently lengthwise advancing the supported chain along a second path transverse to said first path, abutment means engageable with successive similar teeth of a chain supported from said support member for intermittently terminating lengthwise advancement of said chain in timed sequence with back and forth shifting of said saw chain support member, first drive means drivingly connected to said support member for shifting the latter back and forth along said first path and second drive means intermittently driven in timed sequence with reciprocation of said chain support member and for driving connection with a chain supported from said support member to intermittently lengthwise advance said chain along said second path, said abutment means including adjustable means for adjusting the limit of movement of engaged similar teeth along said second path, said second drive means including means for frictionally resisted slip drivingly engaging a chain supported from said support member.

* * * * *